(12) United States Patent
Hattori et al.

(10) Patent No.: US 6,525,126 B1
(45) Date of Patent: Feb. 25, 2003

(54) METHOD FOR PRODUCING REINFORCED THERMOPLASTIC RESIN COMPOSITION AND MELT-KNEADING APPARATUS

(75) Inventors: Takahiro Hattori, Ichihara (JP); Hiroshi Takei, Kisarazu (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/584,395

(22) Filed: Jun. 1, 2000

(30) Foreign Application Priority Data

Jun. 4, 1999 (JP) .............................. 11-158300

(51) Int. Cl.⁷ .............................. C08K 3/34; A21C 1/00
(52) U.S. Cl. ..................... 524/449; 524/494; 524/496; 425/200; 425/201; 425/209
(58) Field of Search ................. 524/401, 449, 524/494, 496; 425/200, 201, 209

(56) References Cited

U.S. PATENT DOCUMENTS 5,238,989 A    8/1993  Takei et al. ................. 524/449
5,264,174 A    11/1993  Takei et al. ............ 264/211.23

*Primary Examiner*—Edward J. Cain
(74) *Attorney, Agent, or Firm*—McDermott, Will & Emery

(57) ABSTRACT

A method for producing a reinforced thermoplastic resin composition in a stable manner for long periods of time, comprising providing a melt-kneading apparatus with a plurality of supply ports arranged in line with the direction, along which a molten resin flows, supplying a polyolefin resin, a solid modifier and a solid radical generator through a first supply port positioned on the most upstream side of the extruder; supplying a flake inorganic filler through a second supply port arranged at a position on the downstream side of the first supply port; supplying a fibrous reinforcing material through a third supply port arranged at a position on the downstream side of the second supply port; and supplying an unsaturated silane compound through a liquid-introducing port arranged at a position on the immediately downstream side of the first supply port and on the upstream side of the second supply port, to thus melt and knead these components. Also provided is a production apparatus for practicing the production method.

7 Claims, 1 Drawing Sheet

METHOD FOR PRODUCING REINFORCED THERMOPLASTIC RESIN COMPOSITION AND MELT-KNEADING APPARATUS

INDUSTRIAL FIELD OF THE INVENTION

The present invention relates to a method for the preparation of a reinforced thermoplastic-resin (in particular, polyolefinic resin) composition and an apparatus for melting and kneading substances, which can suitably be used in the foregoing method. More particularly, the present invention relates to an improved technique which can ensure a strong affinity of a base resin for a reinforcing material incorporated into the resin and substantial solution of a problem concerning the so-called "bridging" phenomenon occurred when a base resin, a reinforcing material and additives are melted and kneaded together, so that a melt-kneading apparatus can continuously be operated stably over a long period of time.

PRIOR ART

A molded product of a reinforced thermoplastic resin, which is produced from a reinforced thermoplastic resin composition comprising an inorganic reinforcing material such as a glass fiber reinforcing material or a inorganic flake filler and a thermoplastic resin (in particular, a polyolefin resin) shows a variety of advantages, by variously selecting the inorganic reinforcing materials. For instance, the molded product can be improved in mechanical properties such as the strength and rigidity thereof and any occurrence of warpage can effectively be prevented. Accordingly, such a reinforced thermoplastic resin composition has widely been used as a material for producing parts of cars such as motorcars, parts of aircraft and parts of shipping, as well as parts of various kinds of industrial machinery, parts and tools of industrial devices, construction materials and other materials.

If the foregoing inorganic reinforcing material and thermoplastic resin are introduced into a melt-kneading apparatus to thus melt and knead them, in the production of a reinforced resin-molded product, the reinforcing material is liable to cause classification at the supply port for the material due to an extreme increase in the viscosity of the molten resin and the incorporation of the inorganic reinforcing material into the base resin, and this in turn makes screws or the like of the melt-kneading apparatus susceptible to wear. In addition, there has been required further improvement in the interfacial affinity between a base resin and an inorganic reinforcing material and therefore, there still remains room for the improvement in, for instance, the durability of the molded product produced using the resulting reinforced resin composition (molten and kneaded product) and the strength and rigidity at a high temperature thereof.

Japanese Un-Examined Patent Publication (hereunder referred to as "J.P. KOKAI") No. Hei 4-25541 proposes, as a measure for the improvement of the interfacial affinity between a base resin and an inorganic reinforcing material, a reinforced polypropylene resin composition which comprises a modified polypropylene obtained by melting and kneading a mixture of an unmodified polypropylene, an unsaturated acid, an unsaturated silane compound and an organic peroxide, as a base resin; and glass fibers and powdery mica as inorganic reinforcing materials. It has been said that such a reinforced resin composition permits the improvement of the interfacial affinity between the base resin and the reinforcing materials incorporated into the resin and that the resin composition can be used as a material for a molded product having excellent durability.

However, if a reinforced resin composition is produced by introducing such a base resin and an inorganic reinforcing material into an extruder to thus melt and knead them in order to produce a molded product, a problem arises, such that there is still room for the improvement in the mechanical strength and rigidity under high temperature conditions, of the resulting molded product and the technique disclosed in the foregoing publication cannot eliminate, at all, the problems of classification and wear of screws, which are observed when the foregoing ingredients are admixed together.

On the other hand, J.P. KOKAI No. Hei 5-96532 proposes a method which utilizes an extruder provided with three supply ports for charging ingredients therein and which comprises the step of supplying, to the extruder, a mixture of polypropylene and an organic peroxide through the first supply port positioned on the most upstream side of the extruder; an inorganic flake filler through the second supply port positioned subsequent to the first supply port; and glass fibers through the third supply port positioned on the most downstream side of the extruder to thereby melt and knead these raw materials. It has been said that this preparation method permits the stable production of the aforementioned resin composition without accompanying any trouble such as classification at the supply ports and also permits the reduction of the wear of, for instance, the screws of the extruder.

In the method for producing such a reinforced resin composition, however, since further improvement of the interfacial affinity between the base resin and the inorganic reinforcing material are required, there is still room for the improvement in the durability of the molded product produced from the composition as well as the mechanical strength and rigidity, at a high temperature, of the molded product.

Taking into consideration the present state of the techniques for producing a reinforced resin compositions, the inventors of this invention have intensively investigated a method for melting and kneading raw materials in an extruder, which makes use of an extruder equipped with three supply ports and which comprises the step of supplying, to the extruder, a mixture of a polyolefin resin, an organic peroxide, an unsaturated acid and an organic silane compound through the first supply port positioned on the most upstream side of the extruder; an inorganic flake filler through the second supply port arranged subsequent to the first supply port; and a fibrous reinforcing material through the third supply port positioned on the most downstream side of the extruder. As a result, the inventors of this invention have succeeded in the preparation of a molded product from a reinforced polyolefin resin composition, excellent in the durability, substantially without accompanying any trouble such as the wear of the screws of the extruder, according to the foregoing method for producing the reinforced resin composition.

However, the method discussed above likewise suffers from a problem in that the "bridging" phenomenon frequently occurs at the first supply port of the melt-kneading apparatus and consequently the apparatus cannot continuously be operated stably over a long period of time.

OBJECT OF THE INVENTION

Accordingly, the present invention relates to an improved technique to solve the foregoing problems associated with the prior art and it is thus an object of the present invention to provide an improved method for producing a reinforced thermoplastic resin composition, which comprises melting and kneading raw materials for a reinforced resin-molded product containing a polyolefin resin, a fibrous reinforcing material and an inorganic flake filler as well as a melt-kneading apparatus suitably used in the preparation method.

More specifically, the object of the present invention is to provide a method and apparatus, which can ensure a high interfacial affinity between a base resin and a reinforcing material included in a reinforced thermoplastic resin composition and which permits the stable production of a reinforced thermoplastic resin composition capable of providing a reinforced resin-molded product excellent in, for instance, durability and mechanical strength and rigidity at a high temperature, without accompanying any problem such as the so-called "bridging" phenomenon and wear of screws, over a long period of time.

SUMMARY OF THE INVENTION

The inventors of this invention have conducted various studies to develop a method for producing a reinforced thermoplastic resin composition using a polyolefin resin as a thermoplastic resin base material, substantially without accompanying the foregoing drawbacks and a production apparatus and have thus completed the present invention.

According to the present invention, there is provided a method for producing a reinforced thermoplastic resin composition, using a melt-kneading apparatus provided with a plurality of supply ports arranged in line with the direction along which a molten resin moves, which comprises the steps of:

supplying a polyolefin resin, a solid modifier and a solid radical generator through a first supply port positioned on the most upstream side of the extruder;

supplying an inorganic flake filler through a second supply port arranged at a position on the downstream side of the first supply port;

supplying a fibrous reinforcing material through a third supply port arranged at a position on the downstream side of the second supply port; and supplying an unsaturated silane compound through a liquid-introducing port arranged at a position on the immediately downstream side of the first supply port and on the upstream side of the second supply port to thereby melt and kneaded the supplied components.

In the method for producing a reinforced thermoplastic resin composition according to the present invention, the inorganic flake filler is preferably powdery mica and the foregoing fibrous reinforcing material is preferably at least one member selected from glass fibers and carbon fibers.

The melt-kneading apparatus according to the present invention comprises:

a cylindrical barrel for melting a base resin introduced through the one side thereof, while moving the resin toward the other side thereof;

a means for melting and kneading the molten resin accommodated in the barrel;

first to third supply ports for the introduction of materials, arranged on the barrel in line with the direction along which the molten resin moves; and a liquid-introduction port arranged at a position on the immediately downstream side of the first supply port and on the upstream side of the second supply port.

In the melt-kneading apparatus according to the present invention, the melt-kneading means thereof may be an extruder provided with a screw and in this case, a seal ring region is preferably arranged at a position between the first and second supply ports of the screw.

In the melt-kneading apparatus according to the present invention, it is desirable that the liquid-introduction port be arranged at a position on the downstream side of the first supply port and within a section wherein the ratio (L/D) of the length to the diameter of the barrel satisfies the following formula: $L/D \leq 2$ and that the section extending from the liquid-introduction port to the second supply port satisfy the relation: $L/D \geq 8$.

In addition, according to a preferred embodiment of the melt-kneading apparatus of the present invention, the apparatus has such a structure that the liquid-introduction port is a through hole formed through the barrel at a position in the vicinity of the first supply port and, to the through hole, a means for feeding a substance under pressure is fitted, said means feeding the liquid unsaturated silane compound to the barrel.

Figure 1A:
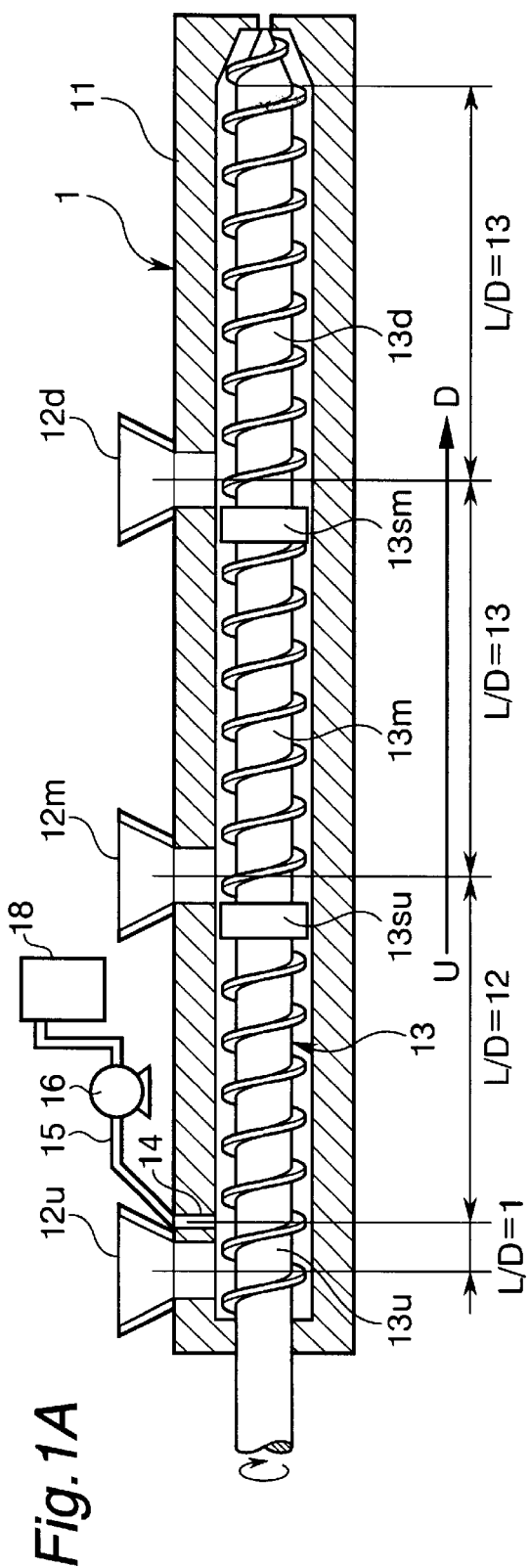
FIG. 1(A) is a schematic cross sectional view of a preferred embodiment of the melt-kneading apparatus according to the present invention.

BEST MODE FOR CARRYING OUT THE INVENTION (Method for Producing Reinforced Thermoplastic Resin Composition)

In the method for producing a reinforced polyolefin resin composition according to the present invention, a molding material comprising a polyolefin resin, a solid modifier, a solid radical generator, an inorganic flake filler and a fibrous reinforcing material is introduced into a melt-kneading apparatus provided with a plurality of material-supply ports arranged in line with the direction along which the molten resin moves and melted and kneaded therein to thus give a reinforced polyolefin resin composition (molten and kneaded product).

First of all, each raw material used in the production method of the present invention will be described in detail.

<Base Resin>

The polyolefin resin used in the present invention as the base material is, in itself, insufficient in superficial affinity for at least one of the fibrous filler and an inorganic flake filler serving as the reinforcing materials to be incorporated into the resin. More specifically, the base resin used in the present invention is an unmodified polyolefin resin and in other words, this resin is a polymer derived from a monomer free of any polar group. In this respect, the monomers free of any polar group are those other than conjugated dienes. The reason for this is that polymeric rubber derived from conjugated dienes may adhere to metals and other substances.

For this reason, the thermoplastic resin used as the base resin in the present invention does not embrace polymers of conjugated dienes, i.e., diene rubber such as natural rubber (abbreviated as "NR"), isoprene rubber (abbreviated as "IR"; cis-1,4 type polyisoprene), chloroprene rubber (abbreviated as "CR"; cis-1,4 type polychloroprene), butadiene rubber (abbreviated as "BR"; cis-1,4 type poly(1,3-butadiene)), butyl rubber (abbreviated as "IIR"; isobutene-isoprene copolymer) and acrylonitrile-butadiene copolymer rubber (abbreviated as "NBR").

The polyolefin resin used as the base material in the present invention includes not only homopolymers derived from lower 1-olefins having 2 to 10, preferably 2 to 6 carbon atoms, but also low crystalline polymers and amorphous polymers recognized and sold as molding resins in the field of resin-molding techniques, among the copolymers of at least two of the 1-olefin monomers. Moreover, the polyolefin resin also includes copolymers of these lower 1-olefin and other polar monomers as minor constituents.

<Solid Modifiers>

The solid modifiers for modifying the base resin used in the present invention are unsaturated carboxylic acids (unsaturated organic acids). The term "unsaturated carboxylic acids" is herein used to denote not only unsaturated carboxylic acids, but also acid anhydrides thereof.

Examples of the solid modifiers usable in the present invention include acrylic acid, methacrylic acid, itaconic acid, maleic acid, fumaric acid, citraconic acid, mesaconic acid, tetrahydrophthalic acid and norbornene dicarboxylic acid as well as acid anhydrides of these acids. These solid modifiers may be used in combination of at least two of them. Among these solid modifiers, particularly preferred is maleic acid anhydride (maleic anhydride).

<Solid Radical Generators>

The "solid radical generator" used for grafting the modifier on to the base resin used in the present invention is also referred to as "(organic) radical initiator" and preferred are organic peroxides among others.

Examples of such organic peroxides include aliphatic peroxides belonging to di-t-butyl peroxide [bis(t-butyl peroxide)] such as 2,5-di-t-butyl peroxyhexane [another name: 2,5-bis(t-butylperoxy) hexane; trade name: Perhexane], 2,5-di-t-butylperoxy hexene [another name: 2,5-bis(t-butylperoxy) hexene; trade name: Perhexene] and 2,5-di-t-butylperoxy hexyne [another name: 2,5-bis(t-butylperoxy) hexyne; trade name: Perhexyne]; and aromatic dibenzoyl peroxides such as dicumyl peroxide (another name: "dicumenyl peroxide") and 1,3-bis(t-butylperoxy) benzene (trade name: Percadox). Among these organic peroxides, preferred are 2,5-bis(t-butylperoxy) hexane and 1,3-bis(t-butylperoxy) benzene.

<Unsaturated Silane Compounds>

In the present invention, the unsaturated silane compound is used for imparting, to the base resin, an affinity for the flake and fibrous fillers as the inorganic reinforcing materials. Such unsaturated silane compounds can be silane compounds containing, in the molecule, at least one unsaturated aliphatic group (alkenyl group) linked thereto, selected from the group consisting of, for instance, vinyl groups, allyl groups (such as vinyl methyl group), crotonyl groups (such as 2-methylvinyl group) and 1-methylvinyl group.

Compounds commonly used as such alkenylsilane compounds are, for instance, alkenyl trialkoxysilanes. Specific examples of the unsaturated silane compounds include:

γ-methacryloxypropyl trimethoxysilane [$CH_2$=$C(CH_3)$ $COO(CH_2)_3Si(OCH_3)_3$],
γ-methacryloxypropyl trimethoxy-silane [$CH_2$=$C(CH_3)$ $COO(CH_2)_3Si(OCH_2CH_3)_3$],
vinyl trimethoxysilane [$CH_2$=$CHSi(OCH_3)_3$],
vinyl triethoxysilane [$CH_2$=$CHSi(OCH_2CH_3)_3$],
vinyl triacetoxysilane [$CH_2$=$CHSi(OCOCH_3)_3$],
methylvinyl dimethoxysilane [$CH_3(CH_2$=$CH)Si(OCH_3)_2$],
methylvinyl diethoxysilane [$CH_3(CH_2$=$CH)Si(O$—$CHCH_2CH_3)_2$],
phenylvinyl dimethoxysilane [$C_6H_5(CH_2$=$CH)Si$ $(OCH_3)_2$],
phenylvinyl diethoxysilane [$C_6H_5(CH_2$=$CH)Si$ $(OCH_2CH_3)_2$],
allyl trimethoxysilane [$CH_2$=$CHCH_2Si(OCH_3)_2$], and
allyl triethoxysilane [$CH_2$=$CHCH_2Si(OCH_2CH_3)_2$].

Among these, preferred are γ-methacryloxypropyl trimethoxysilane and γ-methacryloxypropyl trimethoxysilane. These unsaturated silane compounds may be used in any combination of at least two of them.

<Fibrous Reinforcing Materials>

Among the reinforcing materials used in the present invention, the fibrous reinforcing materials are selected from inorganic fibers and specific examples thereof include wide variety of known ones, for instance, silicate mineral fibers such as glass fibers (glass wool), quartz fibers, rock wool (rock fibers) or asbestos; metal fibers such as steel wool; carbon fibers; and whisker. These fibrous reinforcing materials may be used alone or in any combination, but preferred are glass fibers because of, for instance, excellent reinforcing effects and easy availability. As the glass fibers commonly manufactured and sold, there may be listed glass chopped strands. In general, monofilaments constituting the glass fibers have an average diameter ranging from 5 to 20 μm, preferably 9 to 17 μm and an average length ranging from 0.5 to 10 mm, preferably 1.5 to 6 mm. The glass fibers can be used in the form of monofilaments or bundles thereof. Although glass fibers (glass wool) are in general preferably used in the present invention among the foregoing various kinds of fibrous reinforcing materials from the practical standpoint, carbon fibers are optimum fibrous reinforcing material for applications in which the balance between lightweight properties and strength (specific strength) is the most important aptitude, such as those used in the fields of, for instance, airplanes and racing and sports cars. These fibrous reinforcing materials may be used alone or in any combination of at least two of them, depending on various situations.

In the present invention, it is preferred, from the viewpoint of the reinforcing effect, that a silane coupling agent or the like be applied to the surface of fibrous reinforcing materials to impart, to the surface, the interfacial affinity for a polyolefin resin and/or to improve such an affinity. The amount of the foregoing fibrous reinforcing material to be incorporated into the composition is in general set to a level of not less than 10% by weight and preferably 15 to 40% by weight on the basis of the total weight of the composition.

As the foregoing silane coupling agents usable herein, there may be listed, for instance, saturated silane compounds and unsaturated silane compounds. Among these silane compounds, preferred are unsaturated silane compounds and preferred examples thereof include γ-methacryl oxypropyl trimethoxysilane (unsaturated silane compound 1) and γ-methacryl-oxypropyl triethoxysilane (unsaturated silane compound 2).

<Inorganic Flake Fillers>

Among the inorganic reinforcing materials usable in the present invention, inorganic flake fillers (plate-like reinforcing materials) may be, for instance, powdery mica (isinglass), talc, agalmatolite and glass flakes. These inorganic flake fillers may be used alone or in any combination of at least two of them. Among these inorganic flake fillers, preferred are mica powder from the viewpoint of the rigidity and warping-inhibitory effect of the resulting molded product. Mica is not restricted to any specific one and may be at least one member appropriately selected from the group consisting of, for instance, biotite, muscovite and phlogopite. The shapes of the inorganic flake fillers are not restricted to any specific one, but widely used are those having a maximum average diameter ranging from 10 to 200 μm and preferably 10 to 10 μm. Moreover, the aspect ratio of the inorganic flake fillers is not likewise specifically limited, but desired characteristic properties of the composition can be ensured through the use of inorganic flake fillers whose aspect ratio in general falls within the range of from 10 to 500, preferably 10 to 100 and more preferably 15 to 50. The inorganic flake filler may show its reinforcing effect without any surface treatment with, for instance, silane coupling agent, but the treatment would result in further improvement of the reinforcing effect. In the reinforced resin composition of the present invention, it is preferred that the amount of the inorganic flake filler to be added is not less than 10% by weight and preferably 15 to 50% by weight on the basis of the weight of the resin composition from the view point of, for instance, the rigidity of the molded product and the effect of preventing any warping of the molded product.

In the production method of the present invention, it is possible to add, to the resin composition, a variety of additives such as antioxidants, UV light absorbers, antistatic agents, silane coupling agents, pigments and dyes; and reinforcing materials and fillers other than fibrous reinforcing materials and inorganic flake fillers, in addition to the materials described above, insofar as the addition thereof does not adversely affect the desired effects of the present invention. In the present invention, the method for the incorporation of these additional components is not restricted to any specific one.

<Melt-Kneading Apparatus and Supply Method>

In the method for producing the reinforced thermoplastic resin composition according to the present invention, such polyolefin resin, solid modifier, solid radical generator, unsaturated silane coupling agent, inorganic flake filler and fibrous reinforcing material discussed above are supplied to a melt-kneading apparatus having a specific structure according to a specific manner.

The production method of the present invention utilizes a melt-kneading apparatus which comprises a first supply port disposed at a position on the most upstream side; a second supply port disposed at a position on the downstream side of the first supply port; a third supply port positioned on the downstream side of the second supply port; and a liquid-introduction port arranged on the immediately downstream side of the first supply port and upstream side of the second supply port, wherein said supply ports and introduction port are disposed in line with the direction along which the molten resin flows.

The melt-kneading apparatus used in the method of the present invention may be a variety of apparatuses of this type insofar as they are equipped with such first to third supply ports and a liquid-introduction port arranged at a position on the immediately downstream side of the first supply port. Among these, preferred are screw extruders comprising a built-in screw as a means for melting and kneading a base resin, etc.

The melt-kneading apparatus used in the method of the present invention will hereinafter be described in more detail.

In the method of the present invention, there is used a melt-kneading apparatus comprising a melt-kneading extruder barrel (cylinder) equipped with three supply ports for supplying ingredients, arranged in line with the direction along which the molten resin flows, and further comprising a liquid-introduction port arranged at a specific position separate from and on the downstream side of the first supply port disposed at the most upstream side of the barrel.

As such melt-kneading apparatuses used herein, preferred are screw extruders comprising a built-in screw in the melt-kneading barrel. The screw serves as a melt-kneading means for transporting the base resin in the molten state and additive components charged (or supplied) to the extruder through the barrel, while kneading these ingredients, to extrude the kneaded mixture from the downstream end of the barrel.

A feeder equipped with a weighing device is preferably fitted to each supply port of the melt-kneading apparatus so that the amount of each feed can be controlled.

In the melt-kneading apparatus used in the present invention, particularly preferred are parallel-flow type twin-screw extruders.

The screw usable herein may be any type one such as a "full flighted type screw" in which a spiral groove is formed over approximately whole length thereof starting from the position immediately below the first supply port (on the immediately downstream side thereof), a "seal ring type screw" which is equipped with at least one seal ring in the middle of the full flighted type one, a "pin flight type screw" which is equipped with at least one pin flight in the middle of the full flighted type one, combinations of at least two of the structures of the foregoing screws, a high compression type screw and a low compression type screw, as well as a screw in which the compression ratio is switched at any position on the same screw. These screws can arbitrarily be selected depending on purposes.

Moreover, according to a preferred embodiment of the screw used as a melt-kneading means in the melt-kneading apparatus of the present invention, a seal ring is arranged near the downstream end of each section defined by the positions on which every supply ports are formed, namely arranged on the immediately upstream side of the next supply port in the subsequent section. The role of this seal ring is to ensure the complete kneading or compression in each section by preventing the ingredients present in each section from passing through the section prior to the completion of the working of the section.

The shape of the barrel of the melt-kneading apparatus used in the present invention is not restricted to any specific one, but it is preferred to set the ratio (L/D) of the length (L) of the cylinder to the inner diameter (D) of the barrel (cylinder) in the section extending from the first supply port to the liquid-introduction port to not more than 2 (L/D≦2), from the viewpoint of the reinforcing effect. In addition, the L/D value is preferably set to a level of not less than 8 (L/D≧8) in the sections extending from the liquid-introduction port to the second supply port, from the second supply port to the third supply port and from the third supply port to the downstream edge of the barrel. More preferably, all of the values of L/D are set to the range of from 10 to 15 (wherein L means the center-to-center distance). When an extruder having two or more screws is used, the inner diameter (D) of the barrel for L/D is that per screw.

The liquid-introduction port is arranged between the first and second supply ports. In particular, the liquid-introduction port should be arranged at a position on the upstream side of the center between the first and second supply ports and on the immediately downstream side of the first supply port. The term position "on the immediately downstream side" used herein means the position wherein the base resin or the like fed to the extruder through the first supply port and the silane coupling agent are uniformly melted and kneaded till they reach the second supply port. More specifically, the liquid-introduction port is, for instance, arranged at a position which satisfy the relationship that the ratio (s/m) of the distance s between the first supply port and the liquid-introduction port to the distance m between the first and second supply ports falls within the range of from 1/40 to 1/4, preferably 1/24 to 1/6 and in particular 1/16 to 1/8.

The liquid unsaturated silane compound should be fed to the barrel of the extruder under pressure, against the high pressure established in the barrel (cylinder) and therefore, the liquid-introduction port is provided with a force feed means. Among such means for force feed the liquid unsaturated silane compound into the barrel, preferred are measuring delivery pumps which permit the establishment of a desired amount of the liquid unsaturated compound, such as pressure-measuring delivery pump. The most conspicuous characteristics of the present invention are to use the melt-kneading apparatus equipped with such a liquid-introduction port. In other words, the desired effects of the method according to the present invention can be accomplished without any difficulty only when the apparatus is provided with a liquid supply system comprising the foregoing liquid introduction port and, optionally, the foregoing force feed means and a liquid press-in tube for connecting the force feed means with the liquid-introduction port.

In the method for producing a reinforced thermoplastic resin composition according to the present invention, a polyolefin resin; a solid modifier and a solid radical generator; a flake inorganic filler; and a fibrous reinforcing material are fed, to such a melt-kneading apparatus, through the first, second and third supply ports of the apparatus, respectively, while supplying an unsaturated silane compound through the liquid-introduction port, to thereby melt and knead these ingredients.

In the method of the present invention, the amount of each component for the composition is not restricted to any specific one. However, the solid modifier is used in general in the range of from 0.05 to 5 parts by weight, preferably 0.1 to 1 parts by weight for the solid modifier, and the solid radical generator is used 0.01 to 0.5 parts by weight, preferably 0.05 to 0.2 parts by weight for the solid radical generator, per 100 parts by weight of the polypropylene resin, from the viewpoint of the affinity of the polypropylene resin for the inorganic reinforcing material.

On the other hand, the amounts of the fibrous reinforcing material and the inorganic flake filler can appropriately be selected depending on, for instance, the required mechanical properties of a molded product produced therefrom. However, the method of the present invention would permit the achievement of the desired and marked bridging-prevention effect and the effect of preventing the wear of screws when the fibrous reinforcing material and inorganic flake filler are used in an amount of not less than 10% by weight, in particular, 15 to 40% by weight; and not less than 10% by weight, in particular, 15 to 50% by weight respectively, on the bases of the total weight of the reinforced thermoplastic resin composition.

The extrusion temperature of the resin composition produced by such melt-kneading operations usually ranges from 180 to 300° C. and preferably 200 to 280° C.

(Melt-Kneading Apparatus)

The melt-kneading apparatus according to the present invention can suitably be used in the method for producing a reinforced thermoplastic resin composition and comprises a cylindrical barrel for melting a base resin supplied thereto from one side thereof while transporting the resin toward the other side of the barrel; a melt-kneading means for kneading the molten resin, which is accommodated in the barrel; and first to third ports for supplying raw materials and a liquid-introduction port, which are fitted to the barrel.

In the melt-kneading apparatus according to the present invention, the barrel, first to third supply ports, liquid-introduction port and melt-kneading means are as those defined and described above in connection with the production method of the present invention. The apparatus of the present invention will hereunder be described in more specifically with reference to the accompanying drawings.

FIG. 1A is a schematic longitudinal sectional view showing a preferred embodiment of the melt-kneading kneading apparatus according to the present invention. As shown in FIG. 1A, the melt-kneading apparatus 1 of the present embodiment is a screw type extruder (a parallel-flow type twin-screw extruder). A barrel (cylinder) 11 as the machine body of the melt-kneading apparatus 1 is equipped with a plurality of material-supply ports $12u$, $12m$ and $12d$, in a series, in line with the direction along which the molten resin flows (the direction: "U→D" in FIG. 1). In this embodiment, the plurality of material-supply ports are constituted by a first supply port $12u$ positioned on the most upstream side of the barrel, a second supply port $12m$ arranged on the downstream side of the first supply port $12u$, a third supply port $12d$ arranged on the most downstream side of the barrel and a liquid-introduction port 14 arranged at a position on the immediately downstream side of the first supply port $12u$.

In this embodiment, the ratio (L/D value) of the length (L) of the cylinder to the inner diameter (D) of the barrel 11 is set at a level of 1 for the section between the first supply port $12u$ and the liquid-introduction port 14; 12 for the section between the liquid-introduction port 14 and the second supply port $12m$; and 13 for the sections between the second supply port $12m$ and the third supply port $12n$ and between the third supply port $12n$ and the tip of the barrel.

Two (kneading-extrusion) screws 13 are fitted into the foregoing barrel 11 and each screw 13 is constituted by a screw flight $13u$ on the most upstream side of the barrel, a seal ring $13su$ which comes in contact with the downstream end of the screw flight $13u$, a screw flight $13m$ extending from the downstream end to the midstream of the barrel, a seal ring $13sm$ which comes in contact with the downstream end of the screw flight $13m$, and a screw flight $13d$ at the most downstream side of the barrel starting from the downstream end of the screw flight $13m$.

In addition, a liquid-introduction port (a through hole) is formed in the vicinity of the downstream side (immediately downstream side) of the first supply port arranged on the barrel 11.

A pressurized measuring pump 16 is connected to the liquid-introduction port 14 through a liquid press-in tube 15 and the pump 16 is also connected to a storage tank 18 for storing a liquid additive (in particular, an unsaturated silane compound in the method of the present invention) through a supply tube 17.

The liquid additive stored in the storage tank 16, which is fed to the barrel 11 by the action of the pump 16 is added to the materials such as the molten resin, which have already been introduced into the barrel 11, through the liquid-introduction port 14.

The liquid-introduction port 14 is disposed at a position on the immediately downstream side of the first supply port 12u. More specifically, the liquid-introduction port 14 is arranged at a position apart from the first supply port 12u and the position satisfies the condition that the ratio (s/m) of the distances between the first supplying port 12u and the liquid-introduction port 14 to the distance m between the first supply port 12u and the second supply port 12m is equal to 1/12. In this respect, if the liquid-introduction port 14 is arranged on a more downstream side of the barrel, for instance, at the center of the section between the first and second supply ports 12u, 12m, any desired effect cannot often been ensured by the addition of an unsaturated silane compound.

A preferred embodiment of the melt-kneading apparatus according to the present invention has specifically been described above with reference to the accompanying drawing, but it is a matter of course that the design of the apparatus can variously be changed without departing from the intended purpose of the present invention.

For instance, the melt-kneading apparatus according to the present invention may comprise at least two liquid-introduction ports for charging liquid additives, which are formed through the barrel 11. That is, a liquid-introduction port may be formed in the vicinity of the second supply port 12m and/or the third supply port 12d, in addition to the port 14 formed on the immediately downstream side of the first supply port 12u. These additional liquid-introduction ports are preferably arranged at a position on the immediately downstream sides of the second supply port 12m and/or the third supply port 12d. In this respect, it is needless to say that the liquid-introduction port 14 positioned on the most upstream side of the barrel is an essential element among the plural liquid-introduction ports.

Alternatively, the melt-kneading apparatus according to the present invention may further comprise at least one supply port, in addition to the second supply port, between the first and third supply ports. In particular, if a large amount of an inorganic flake filler is charged (or added) to the barrel, an excellent effect may sometimes be obtained by feeding a part of the inorganic flake filler through the second supply port and feeding the balance thereof through these additional supply ports, instead of supply of the whole filler through only the second supply port.

Effects of the Invention

The method for producing a reinforced thermoplastic resin composition and the melt-kneading apparatus according to the present invention permits the stable supply of a reinforced resin composition, over a long period of time, which can produce molded products having excellent mechanical strength at high and low temperatures and excellent durability, while efficiently.eliminating the problems such as the classification of reinforcing materials and bridging easily caused at the material-supply ports of the melt-kneading apparatus, and any wear of means for melting and kneading resins, for instance, screws.

EXAMPLES

The present invention will hereinafter be described in more specifically with reference to the following Examples and, if necessary, Comparative Examples, but the present invention is by no means limited to these specific Examples.

<Methods of Evaluation>

(1) Evaluation of Bridging: Each melt-kneading apparatus was operated over two hours and the frequency of bridging observed during the operation was counted.

(2) Evaluation of Fatigue Limit at 80° C.: A test piece of type I was used for the determination of bending vibrational fatigue characteristics in an atmosphere of 80° C., according to the method specified in ASTM D671-B. The stress at $10^7$ cycles was determined from the stress cycle curve and it was defined to be the fatigue limit in question.

(3) Evaluation of Tensile Strength at 100° C.: A JIS No.1 tensile dumbbell was used to determine its tensile strength in an atmosphere of 100° C. according to the method specified in JIS K-7113.

<Raw Materials for Molding>

(1) Production of Resin Mixture 1: A resin mixture 1 was produced by sufficiently mixing, in a Henschel mixer (trade name), 99.2% by weight of a polypropylene homopolymer having a melt flow rate (MRF (230° C.; 21.2 N)) of 2 g/10 min, 0.1% by weight of 2,6-di-t-butyl-p-cresol as an antioxidant, 0.1% by weight of calcium stearate as a lubricating agent, 0.1% by weight of 1,3-bis (t-butyl peroxyisopropyl) benzene as a solid radical generator and 0.5% by weight of maleic anhydride (maleic acid anhydride) as a solid modifier.

(2) Production of Resin Mixture 2: A resin mixture 2 was produced by sufficiently mixing, in a Henschel mixer, 98.7% by weight of a polypropylene homopolymer having a melt flow rate (MRF (230° C.; 21.2 N)) of 2 g/10 min, 0.1% by weight of 2,6-di-t-butyl-p-cresol as an antioxidant, 0.1% by weight of calcium stearate as a lubricating agent, 0.1% by weight of 1,3-bis(t-butyl peroxyisopropyl) benzene as a solid radical generator, 0.5% by weight of maleic anhydride (maleic acid anhydride) as a solid modifier and 0.5% by weight of γ-methacryloxy propyl trimethoxysilane as an unsaturated silane compound.

(3) Liquid Unsaturated Silane Compound: The following compounds were used:

Liquid Unsaturated Silane Compound 1: γ-methacryloxy propyl trimethoxysilane;

Liquid Unsaturated Silane Compound 2: γ-methacryloxy propyl triethoxysilane.

(4) Production of Mica Powder: The mica powder used herein was muscovite powder having an average particle size of 15 μm and an aspect ratio of 30.

(5) Glass Fibers Used: The glass fibers used herein were those having an average fiber diameter of 9 μm and an average chopped length (average fiber length) of 3 mm.

Example 1

Figure 1B:
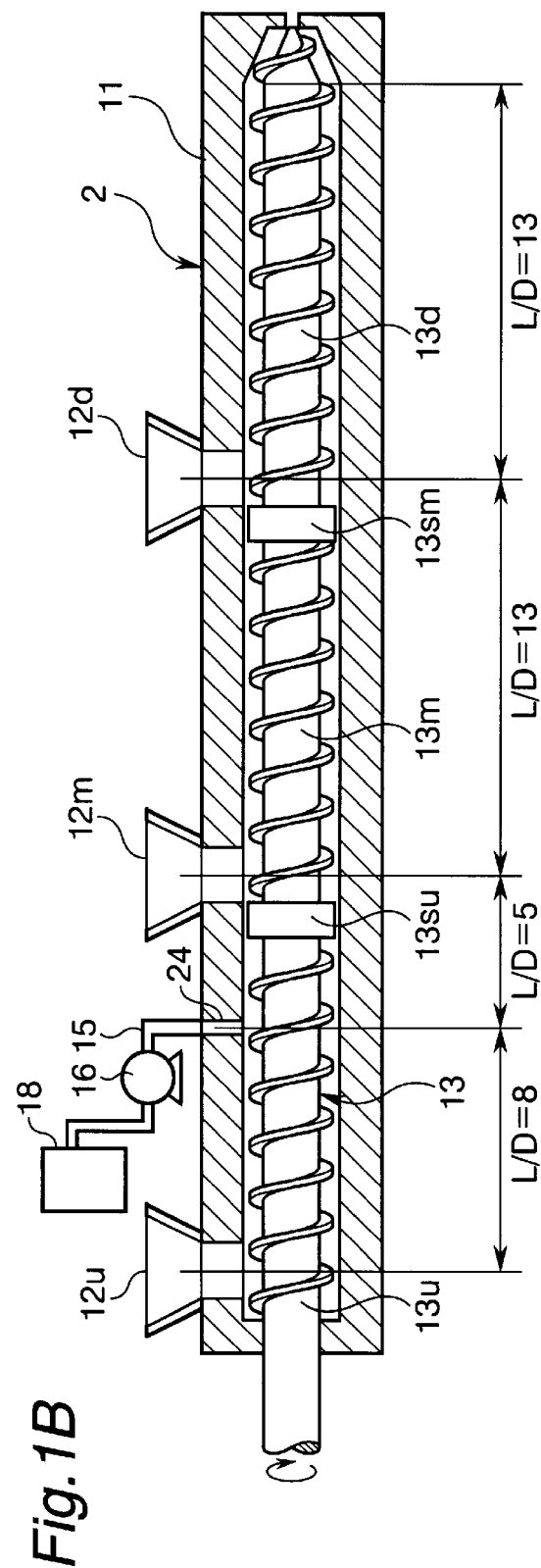
FIG. 1(B) is a schematic cross sectional view of a melt-kneading apparatus used in Comparative Example 3.

A melt-kneading apparatus having a structure identical to that of the apparatus 1 as shown in FIG. 1 (a parallel-flow type twin screw extruder; bore diameter: 45 mm) was used in this example. Incidentally, all of the ratios: L/D for the "shapes of the screw within sections" were set to a level of 13 for the sections between the first and second supply ports, between the second and third supply ports and between the third supply port and the tip of the barrel in the melt-kneading apparatus 1 used in this example. In this connection, the "D" was set at a constant value for all of the sections and the value "L" or the length of the sectional screw was defined to be the center-to-center distance between the neighboring supply ports or liquid-introduction port.

Moreover, the ratio: L/D for the section between the first supply port 12u and the liquid-introduction port 14 was set at 1 in the melt-kneading apparatus 1 (while the ratio L/D for the section between the liquid-introduction port 14 and the second supply port 12m was L/D=12).

There were supplied to such a melt-kneading apparatus 49.5% by weight of the resin mixture 1, 0.5% by weight of the unsaturated silane compound 1, 20% by weight of the mica powder as the inorganic flake filler and 30% by weight of the glass fibers (GF) as the fibrous reinforcing material through the first supply port 12u, the liquid-introduction port 14, the second supply port 12m and the third supply port 12d, respectively, while melting and kneading them at 250° C. to give a molten and kneaded product, followed by extruding the molten/kneaded product into reinforced strands through the extrusion nozzle and an extrusion die (not shown) fitted to the end of the barrel. The extruded reinforced strands were continuously passed through a cooling water bath (not shown) to thus cool the same to a desired temperature and then cut (or pelletized; granulated) into pieces using a strand cutter (not shown) to give reinforced pellets (reinforced particulate material).

As a result, it was found that there was not observed any bridging at all of the three material-supply ports 12u, 12m and 12d during the production of the foregoing reinforcing material-containing pellets (reinforced composition) and the pellets were continuously and stably be produced.

The resulting reinforced pellets were fed to an injection molding machine to form test pieces (specimens) and the resulting test pieces were used for the inspection of various properties thereof. As a result, there were obtained such a good results that the fatigue limit at 80° C. and the tensile strength at 100° C. were found to be 41 MPa and 63 MPa, respectively. Table 1 given below shows these results of quality evaluation, kinds and amounts of components used and comments on the operations of the apparatus at the stage of blending the same (or during the blending).

Example 2

The same procedures as in Example 1 were repeated using the manufacturing apparatus 1 according to the present invention except that the amounts of mica powder and glass fibers fed to the apparatus through the supply ports 12 were set at the values specified in Table 1, respectively and that the liquid unsaturated silane compound 2 was used, to thus form test pieces (specimens) and the resulting test pieces were used for the inspection of various properties thereof.

As a result, there were obtained such a good results that the fatigue limit at 80° C. and the tensile strength at 100° C. were found to be 34 MPa and 41 MPa, respectively. Table 1 given below shows these results of quality evaluation, kinds and amounts of components used and comments on the operations of the apparatus at the stage of blending the same (or during the blending).

Comparative Example 1

The same operations as in Example 1 were repeated under the same conditions as in Example 1 using a melt-kneading apparatus 1 identical to that used in Example 1 except that any liquid unsaturated silane compound was not fed to the apparatus, to thus give a reinforcing material-containing resin composition.

As a result, it was found that the test piece formed from the resulting composition had a fatigue limit at 80° C. of 25 MPa and a tensile strength at 100° C. of 43 MPa. The fatigue limit at 80° C. was considerably lower than the desired level thereof. This would be because the test piece is inferior in the interfacial affinity of the base resin for the reinforcing material as the constituents of the piece. Table 1 given below,, shows these test results, kinds and amounts of components used and comments on the operations of the apparatus at the stage of blending the same (or during the blending).

Comparative Example 2

Pellets were produced by repeating the same operations and conditions used in Example 1 using a melt-kneading apparatus 1 identical to that used in Example 1 except that the liquid unsaturated silane compound was fed to the apparatus along with the resin mixture 1 through the first supply port 12u instead of the charging of the silane compound through the liquid press-in port 14 arranged immediately downstream side of the first supply port 12u.

However, bridging was frequently caused (11 times per 2 hours) at the first supply port 12u during the operation of the apparatus 1. It was difficult to stably supply the feed stocks to the extrusion barrel 11, but the operation of the apparatus was forcibly continued to form a test piece.

As a result, it was found that the test piece formed from the resulting pellets had a fatigue limit at 80° C. of 40 MPa and a tensile strength at 100° C. of 48 MPa. More specifically, the fatigue limit thereof was acceptable, but the tensile strength was far below the desired level. Table 1 given below shows these test results, kinds and amounts of components used and comments on the operations of the apparatus at the stage of blending the same (or during the blending).

Comparative Example 3

Pellets were produced and a test piece was prepared from the pellets by repeating the same procedures used in Example 1 except for using a melt-kneading apparatus 2 having a structure as shown in FIG. 2.

The melt-kneading apparatus shown in FIG. 2 has a structure identical to that of the apparatus as shown in FIG. 1 except that a liquid-introduction port 24 is positioned between the first supply port 12u and the second supply port 12m and inclined towards the second supply port 12m. In this connection, all the structural features shown in FIG. 2, which are identical to those shown in FIG. 1, bear the same reference numerals and the details thereof will therefore be omitted.

Regarding the shape of the screw of the apparatus 2, the ratio: L/D was set to 8 for the section between the first supply port 22u and the liquid-introduction port 24 (while the ratio was set at a level of 5 for the section between the liquid-introduction port 24 to the second supply port 24m).

As a result, it was found that the test piece thus formed had a fatigue limit at 80° C. of 27 MPa and a tensile strength at 100° C. of 46 MPa. The fatigue limit at 80° C. was considerably lower than the desired level thereof. This would be because the position at which the unsaturated silane compound was added was improper. Table 1 given below shows these test results, kinds and amounts of components used, and comments on the operations of the apparatus at the stage of blending the same (or during the blending).

TABLE 1

Screw Extruder Equipped with Multiple Supply Ports and Liquid Pump According to the present Invention

| Ex. No. | 1st Supply Port (Hopper) Resin Mixture Kind (Amt. (wt %)) | 1st Liquid-Intro. Port Unsaturated Silane Compound Kind (Amt. (wt %)) | 2nd Liquid-Intro. Port Kind (Amt. (wt %)) | 2nd Supply Port (Hopper) Flake Filler Kind (Amt. (wt %)) | 3rd Supply Port (Hopper) Fibrous Reinforcing Material Kind (Amt. (wt %)) |
|---|---|---|---|---|---|
| Ex.1 | 1 (40.5) | 1 (0.5) | — (—) | Mica powder (20) | GF (30) |
| Ex. 2 | 2 (64.5) | 2 (0.5) | — (—) | Mica powder (25) | GF (10) |
| Co. Ex. 1 | 1 (50) | — (—) | — (—) | Mica powder (20) | GF (30) |
| Co. Ex. 2 | 2 (50) | — (—) | — (—) | Mica powder (20) | GF (30) |
| Co. Ex. 3 | 3 (49.5) | — (—) | 1 (0.5) | Mica powder (20) | GF (30) |

| | Results of Quality Modification | | |
|---|---|---|---|
| Ex. No. | Occurrence of Bridging Occurrence | Fatigue Limit at 80° C. MPa | Tensile Strength at 100° C. MPa |
| Ex. 1 | None | 41 | 63 |
| Ex. 2 | None | 34 | 41 |
| Co. Ex. 1 | None | 25 | 43 |
| Co. Ex. 2 | High Frequency | 40 | 48 |
| Co. Ex. 3 | None | 27 | 46 |

Unsaturated Silane Compound 1: γ-methacryloxypropyl trimethoxysilane;
Unsaturated Silane Compound 2: γ-methacryloxypropyl triethoxysilane;
GF: glass fibers;

What is claimed is:

1. A method for producing a reinforced thermoplastic resin composition, using a melt-kneading apparatus provided with a plurality of supply ports arranged in line with the direction along which a molten resin moves, which comprises the steps of:

supplying a polyolefin resin, a solid modifier and a solid radical generator through a first supply port positioned on the most upstream side of the extruder;

supplying an inorganic flake filler through a second supply port arranged at a position on the downstream side of the first supply port;

supplying a fibrous reinforcing material through a third supply port arranged at a position on the downstream side of the second supply port; and supplying an unsaturated silane compound through a liquid-introducing port arranged at a position on the immediately downstream side of the first supply port and on the upstream side of the second supply port, to thereby melt and knead the supplied components.

2. The method for producing a reinforced thermoplastic resin composition as set forth in claim 1 wherein the inorganic flake filler is mica powder.

3. The method for producing a reinforced thermoplastic resin composition as set forth in claim 1 wherein the fibrous reinforcing material is at least one member selected from the group consisting of glass fibers and carbon fibers.

4. A melt-kneading apparatus which comprises:

a cylindrical barrel for melting a base resin introduced through the one side thereof, while moving the resin toward the other side thereof;

a means for melting and kneading the molten resin accommodated in the barrel;

first to third supply ports for the introduction of materials, arranged on the barrel in line with the direction along which the molten resin moves; and a liquid-introduction port arranged at a position on the immediately downstream side of the first supply port, and within the section which satisfies the relation: $L/D \leq 2$, wherein L represents the length of the barrel and D represents the inner diameter of the barrel and the section extending from the liquid-introduction port to the second supply port satisfies the relation: $L/D \geq 8$.

5. The melt-kneading apparatus as set forth in claim 4 wherein the melt-kneading means is a screw which is provided with a seal ring region at a position between the first and second supply ports.

6. The melt-kneading apparatus as set forth in any one of claim 4 or 5 wherein the liquid-introduction port is a hole formed through the barrel and positioned near the first supply port and a press-in means for feeding, under pressure, a liquid unsaturated silane compound to the barrel therethrough is fitted to the through hole.

7. The melt-kneading apparatus as set forth in any one of claim 4 or 5, wherein the liquid-introduction port is positioned on the downstream side of the first supply port which satisfies the relationship that the ratio of the distance between the first supply port and the liquid-introduction port (s) and the distance between the first and second supply ports (m) falls with the range from 1/40 to 1/4, and on the upstream side of the second supply port.

* * * * *